United States Patent

[11] 3,573,879

| [72] | Inventors | Robert L. Bergkamp;<br>Helen Gerber Bergkamp, RR 2, Cheney,<br>Kans. 67025 |
|---|---|---|
| [21] | Appl. No. | 831,028 |
| [22] | Filed | June 6, 1969 |
| [45] | Patented | Apr. 6, 1971 |

[54] CART FOR CLEANING IMPLEMENTS
7 Claims, 9 Drawing Figs.

[52] U.S. Cl. ..................................... 280/47.19,
280/47.35, 312/250, 312/290
[51] Int. Cl. ..................................... B62b 1/12
[50] Field of Search............................. 280/47.35,
47.26, 47.19; 312/250, 290

[56] References Cited
UNITED STATES PATENTS

| 561,690 | 6/1896 | Pfender................. | 312/290X |
| 808,739 | 1/1906 | Focht.................... | 280/47.35X |
| 1,427,388 | 8/1922 | Holley.................. | (312/290UX) |
| 1,962,454 | 6/1934 | Meanor et al.......... | 312/250X |
| 2,634,189 | 4/1953 | Hill....................... | 312/250 |

FOREIGN PATENTS

| 665,962 | 7/1963 | Canada................. | 312/200 |

Primary Examiner—Leo Friaglia
Assistant Examiner—Winston H. Douglas
Attorney—John N. Randolph ABSTRACT: A cart for conveniently storing and transporting all of the implements and other items required for cleaning homes, office buildings, hospitals and the like, which is so constructed that it can be conveniently conveyed up or down stairs, which normally assumes a substantially upright position with all of the contents thereof readily accessible, and which includes a receptacle which may be readily swung outwardly to an open position to receive trash and other refuse to be disposed of and which is capable of being readily removed from the cart for emptying the contents thereof.

PATENTED APR 6 1971
3,573,879
SHEET 1 OF 2
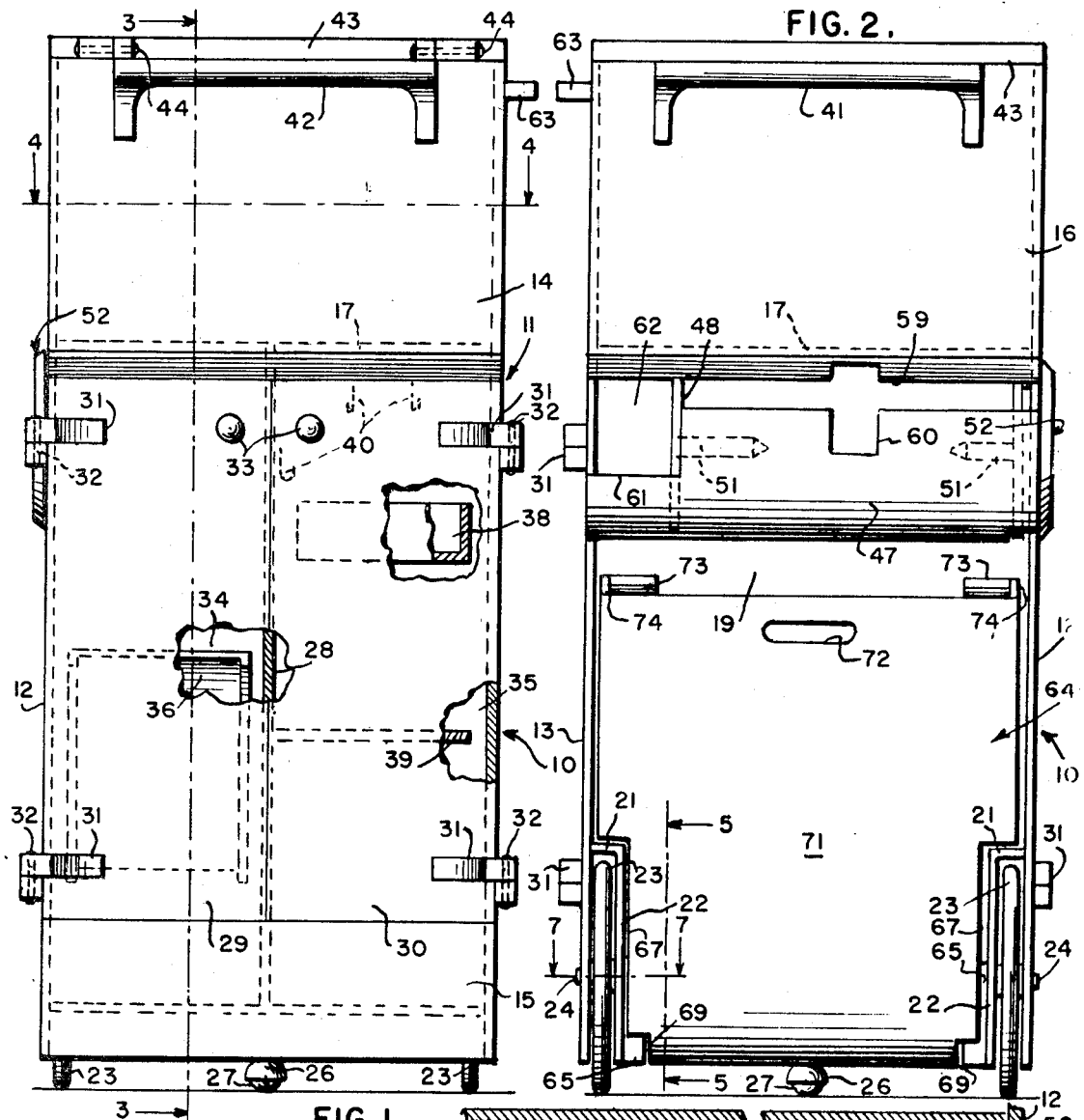
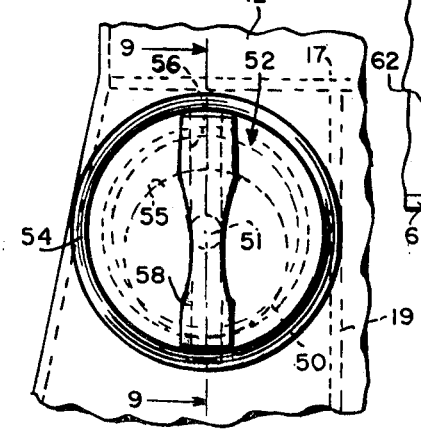
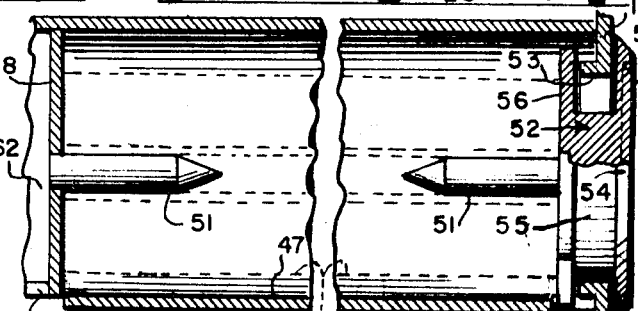
FIG. 1. FIG. 2. FIG. 8. FIG. 9.
INVENTORS
ROBERT L. BERGKAMP
HELEN GERBER BERGKAMP
BY John N. Randolph
ATTORNEY

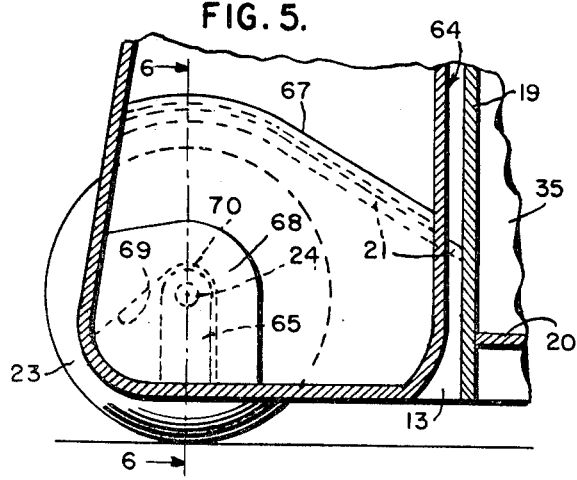
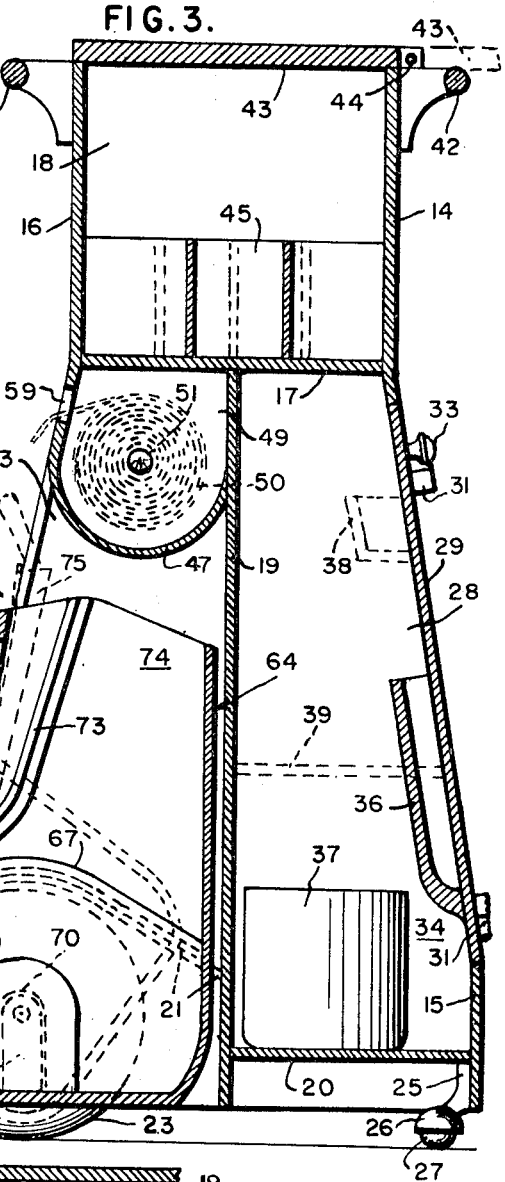
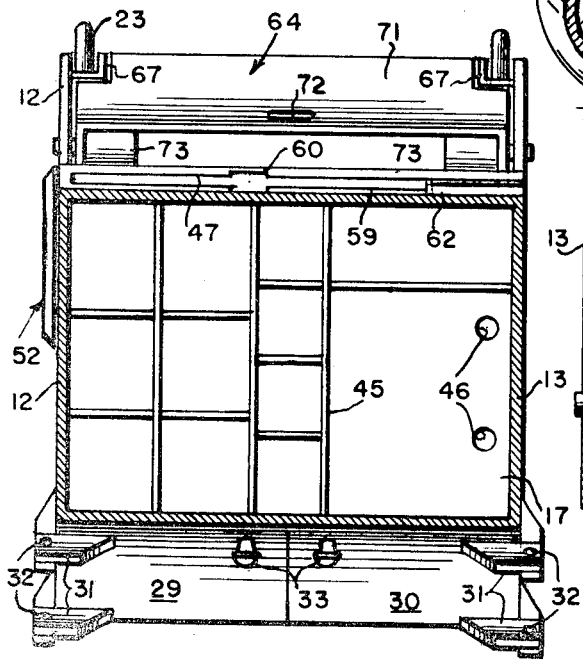

CART FOR CLEANING IMPLEMENTS

It is a primary object of the invention to provide a single unit capable of use for conveniently storing and transporting all of the implements and items required for cleaning homes, offices and the like, and which will eliminate the necessity of individually storing and transporting such items.

Another object of the invention is to provide a cart for accomplishing the aforementioned purposes which is compact and yet capable of containing all of the implements and items required for cleaning in a manner such that the items are readily accessible.

A further object of the invention is to provide a cart including a cabinet portion for containing many of the cleaning implements and items, and which additionally includes holders and receptacles for frequently used items which are accessible without opening the cabinet.

A further object of the invention is to provide a cart having a uniquely constructed and mounted receptacle which may be readily swung outwardly to an open position for receiving trash and readily detached from the cart for emptying the contents of said receptacle.

Various other objects and advantages of the invention will hereinafter become more fully apparent from the following description of the drawings, illustrating a presently preferred embodiment thereof, and wherein:

BRIEF DESCRIPTION OF THE DRAWINGS

FIG. 1 is a front elevational view of the cart, partly broken away and partly in section;

FIG. 2 is a rear elevational view thereof;

FIG. 3 is a vertical sectional view taken substantially along a plane as indicated by the line 3–3 of FIG. 1;

FIG. 4 is a horizontal sectional view taken substantially along a plane as indicated by the line 4–4 of FIG. 1;

FIG. 5 is an enlarged fragmentary vertical sectional view taken substantially along a plane as indicated by the line 5–5 of FIG. 2;

FIG. 6 is a fragmentary vertical sectional view taken substantially along a plane as indicated by the line 6–6 of FIG. 5;

FIG. 7 is an enlarged fragmentary horizontal sectional view taken substantially along a plane as indicated by the line 7–7 of FIG. 2;

FIG. 8 is an enlarged fragmentary view in side elevation of a portion of the cart, looking from left to right of FIG. 1, and FIG. 9 is a fragmentary vertical sectional view taken substantially along a plane as indicated by the line 9–9 of FIG. 8.

DESCRIPTION OF THE PREFERRED EMBODIMENT

The cart for cleaning implements in its entirety is designated generally 10 and includes an elongated, normally upright frame, designated generally 11, having sidewalls 12 and 13, an upper front wall 14, a lower front wall 15 and a rear wall 16. The walls 14, 15 and 16 extend between and are secured to the sidewalls 12 and 13. The walls 14 and 16 are substantially coextensive, as seen in FIG. 3, and are connected adjacent their lower ends by horizontal wall 17 which combines with the walls 14 and 16 and upper portions of the walls 12 and 13 to define an upper compartment 18 having an open top. A transverse wall 19 extends downwardly from the horizontal wall 17 to the lower ends of the walls 12 and 13, is connected thereto and is disposed approximately midway between and parallel to the walls 14 and 16. A bottom wall 20 extends between the walls 15 and 19 and the walls 12 and 13, and is secured to said walls and disposed somewhat above the bottom edges thereof.

The side edges of the walls 12 and 13 diverge downwardly from the horizontal wall 17. The lower rear portions of the walls 12 and 13 have inwardly extending ledges 21 which extend from the rear edges of said walls to the wall 19, and which are rounded and downwardly inclined toward the wall 19, as seen in FIG. 3. A wall 22 extends downwardly from the inner edge of each ledge 21 and combines therewith and with the lower portion of the wall 12 and 13, adjacent to which it is disposed, to define a downwardly opening chamber to receive a wheel 23. Wheels 23 are journaled on axles 24 one of which extends through the wall 12 and of the adjacent wall 22, and the other of which extends through the wall 13 and the other wall 22. The wheels 23 protrude below the bottom edges of the walls 12, 13 and 22. A post 25 is fixed to the lower portion of the wall 15 and extends downwardly therefrom and terminates in a socket 26 in which a ball or sphere 27 is rotatably confined. The ball 27 is disposed midway between the walls 12 and 13 and combines with the rear wheels 23 to provide a tricycle-type mobile support for the cart 10.

A vertical partition wall 28 extends between the horizontal walls 17 and 20 and between parts of the front walls 14 and 15 and the transverse wall 19, and is disposed approximately midway between the sidewalls 12 and 13, as seen in FIG. 1. Doors 29 and 30 extend between the front walls 14 and 15 and are swingable connected by hinges 31 to the sidewalls 12 and 13, respectively. Hinge pins 32 of the hinges 31 are spaced outwardly from the sidewalls 12 and 13, as best seen in FIG. 4, to enable the doors to be swung from their closed positions, as illustrated, through arcs of approximately 270° to fully open positions against the outer sides of the walls 12 and 13. Each door is equipped with a knob 33 for opening and closing said doors. Doors 29 and 30 cooperate with the walls 19 and 28, a portion of the walls 12, 13 and 17 and the wall 20, to form a cabinet having two compartments 34 and 35.

As seen in FIG. 3, the door 29 has a pocket 36 on its inner side for holding disposable cloths. The remainder of the compartment 36 is available for holding large items, such as a bucket 37, as illustrated, or a portable vacuum cleaner, not shown. The door 30 has a rack on its inner side for storing containers of cleaning materials, and said compartment 35 may be additionally provided with a shelf 39 and supporting hooks 40.

The rear wall 16 has a transversely extending handle 41 adjacent its upper end and a similar handle 42 is provided on the front wall 14. A flat cover 43 closes the open top of the compartment 18 and is pivotally mounted at 44 to swing through an arc of approximately 180° to an open position, as seen in dotted lines in FIG. 3, resting upon the handle 42, to provide a shelf. A removable divider or grid 45 is supported on the wall 17, within the compartment 18, for holding additional containers of cleaning materials, or the like. As seen in FIG. 4, one corner of the wall 17 is not covered by the divider 45, and said corner has openings 46 for the handles of mops or brooms, not shown, which extend downwardly therethrough and so that the broom and mop heads can be disposed in the compartment 18. As seen in FIG. 1, the rack 38 and shelf 39 are spaced from the wall 13 to provide a space through which the mop and broom handles can extend.

A wall 47 of arcuate, downwardly bowed cross section, as seen in FIG. 3, extends between rear portions of the walls 12 and 13 and from the wall 19 to rear edges of the walls 12 and 13 to combine with parts of the walls 12, 17 and 19 and a wall 48, which extends downwardly from the wall 17, to define a compartment 49 for a paper tower roll 50, the tubular core of which is rotatably supported on dowels 51. One of said dowels extends inwardly from the wall 48 and the other dowel extends from a closure member 52 which is mounted in an access opening 53 of the wall 12, through which the towel roll is applied to the compartment 49. The closure 52 has an outer disc portion 54, larger than the opening 53, a hub portion 55 which extends through said opening, and a bar 56 which extends across the inner face of the hub 55 and the ends of which are spaced different distances from the periphery of said hub. The bar 56 spans the opening 53 in the position of the closure as seen in FIG. 9. The hub 55 is eccentrically disposed relative to the disc 54 and is substantially smaller than the opening 53, so that when the closure 52 is revolved a half turn from its position of FIG. 9, the end of the bar 56, which is located nearer the periphery of the hub 55, can pass through the opening 53 for applying the closure 52 thereto or for removing it therefrom. A slot 57 is provided in the bottom of the wall 47 to accommodate the ends of the bar 56 and to permit rocking movement of the closure 52 for passage of the bar through the opening 53. The outer face of the disc 54 is recessed and is provided with a handle 58, as seen in FIG. 8.

As seen in FIG. 2, the upper edge of the wall 47 terminates below the bottom edge of the wall 16 to provide a slot 59 through which the paper towel 50 can be withdrawn from the compartment 49, and the walls 16 and 47 are recessed, intermediate of the ends of the slot 59, to provide an access opening 60 for the fingers for grasping the towel 50. As seen in FIG. 2, the rear edge of the wall 47 is cut away, as seen at 61, between the walls 13 and 48, to provide a compartment 62 for the storage of cloths, cleaning tissue, towels, or the like. A towel rack 63 extends transversely across the upper portion of the sidewall 13.

An open top refuse receptacle 64 occupies the space beneath the wall 47 and behind the rear wall of the cabinet compartments 34 and 35. As seen in FIGS. 6 and 7, the axles 24 extend inwardly from the walls 22 to support posts 65 which are disposed immovably against the adjacent faces of said walls 22 and which extend downwardly therefrom and have rounded, upper ends, as best seen in FIGS. 3 and 5.

The receptacle 64 has sidewalls 66 which are provided with inwardly offset lower portions 67. The bottom parts of the wall portions 67 are internally thickened, as seen at 68 in FIG. 6, and are provided with recesses 69 which open downwardly and outwardly thereof and which are flared in width from their rounded upper ends 70 to their open lower ends, as seen in FIGS. 3 and 5. Said rounded upper portions 70 rest upon the rounded upper ends of the posts 65 for supporting the receptacle 65 in the cart 10, and the shape of said recesses 69 permits the receptacle 64 to swing from its substantially upright closed position of FIGS. 3 and 5 outwardly and rearwardly to its dotted line, open position of FIG. 3 about the rounded upper ends of the posts 65 as fulcrums. Additionally, the upright side edges of the posts 65 provide stops to be engaged by the diverging walls of the recesses 69 to limit the swinging movement of the receptacle 64. The rear wall 71 of the receptacle 64 has a finger opening 72 by which the receptacle can be grasped for moving it between its full and dotted line positions of FIG. 3 or for detaching it from the posts 65 and cart 10, when in its dotted line position of FIG. 3, for emptying the contents thereof.

Ledges 73 are secured to the inner faces of the sidewalls 74 of the receptacle 64 for supporting a dustpan 75 in the upper rear portion of said receptacle. The handle of the dustpan may be utilized for swinging the receptacle between its open and closed positions of FIG. 3.

The cart 10 can be moved about on its wheels 23 and the ball 27 by grasping and pulling or pushing on either the handle 41 or the handle 42. The cart 10 can also be readily moved up and down stairs by grasping the handle 41 and rocking the cart counterclockwise, as seen in FIG. 3, about the wheels 23, to elevate the ball 27 so that the cart will then be supported solely by the wheels 23.

Various modifications and changes are contemplated and may be resorted to without departing from the function or scope of the invention.

We claim:

1. A cart for cleaning implements comprising an elongated upright frame, a tricycle-type running gear unit providing a mobile support for the frame, said frame having a front and rear portion in relation to the direction of movement thereof, a cabinet provided in the front portion of said frame having forwardly facing hinged doors, a top compartment disposed above the cabinet having an open top, a handle attached to an upper part of the frame for manually propelling the cart on its running gear, said frame including a compartment disposed behind an upper portion of said cabinet for receiving a roll of paper towels, means for rotatably supporting the towel roll in said compartment, and said compartment having a rearwardly opening slot for extracting the toweling from the roll and compartment.

2. A cart as in claim 1, a refuse receptacle, and means swingably and detachably supporting the refuse receptacle in the lower rear portion of the cart behind said cabinet for swinging movement between a substantially upright closed position and an upwardly and rearwardly inclined open portion and for detachment of the receptacle from the cart in said open position thereof.

3. A cart as in claim 1, said cabinet including compartments disposed in side by side relation, and means contained in said compartments for storing cleaning implements and supplies.

4. A cart as in claim 1, and a divider detachably mounted in said top compartment for holding and confining containers for cleaning materials.

5. A cart as in claim 1, said top compartment having a bottom wall provided with openings communicating with the cabinet through which are adapted to extend handles of mops or brooms the heads of which are contained in said top compartment.

6. A cart as in claim 1, a cover for closing the open top of said top compartment, means swingably connecting the cover to the cart for swinging movement through an arc of approximately 180° from a closed position to an open position, said handle providing a support for the cover in its open position to provide a shelf.

7. A cart as in claim 1, said running gear unit including two large transversely spaced rear wheels on which the cart can be supported in a tilted position for travel up and down stairs.